July 8, 1941.  W. MÜLLER  2,248,889
VOLTAGE DIVIDER
Filed July 12, 1938
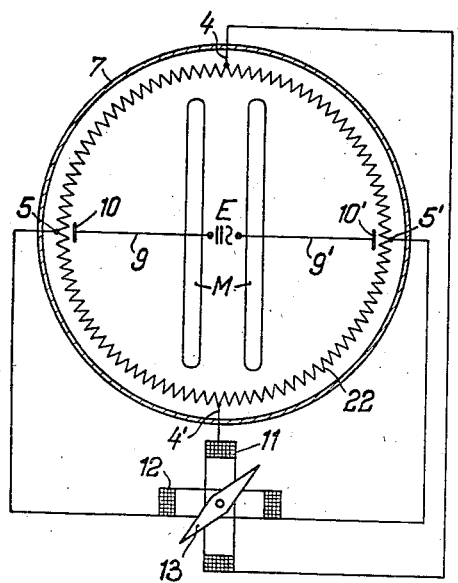
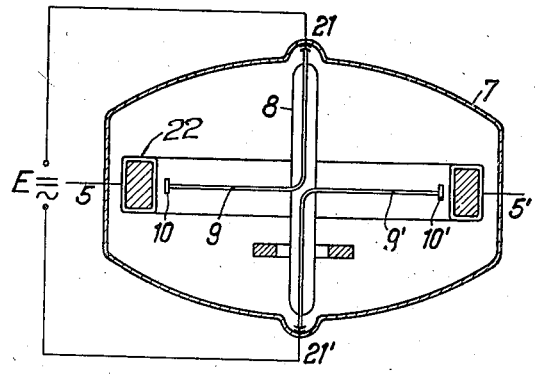
Inventor:
Wolfgang Müller
By A. D. Adams
Attorney Patented July 8, 1941

2,248,889

UNITED STATES PATENT OFFICE 2,248,889

VOLTAGE DIVIDER

Wolfgang Müller, Berlin-Lankwitz, Germany, assignor to Askania-Werke A. G. vormals Centralwerkstatt-Dessau und Carl Bamberg-Friedenau, a corporation of Germany Application July 12, 1938, Serial No. 218,892
In Germany July 13, 1937

3 Claims. (Cl. 250—27.5)

The present invention relates to a voltage divider or potentiometer for feeding cooperating coils, respectively coil systems of an electrical instrument with variable voltage. Such a device is of importance, for instance for remote transmissions, in which the voltage divider or potentiometer acts as transmitter from which in dependence on the displacement of the transmitter variable voltages are received and in which the electrical instrument acts as receiver, whose coils, respectively coil systems, lie at these tensions. Especially such receiving instruments may be used whose indication is given through the relative adjustment of a magnetic field composed of several field components, generated in coils of the instrument with respect to a magnetic reference field. Such instruments have become especially well-known as meter for measuring the proportion of two currents (quotient meter) with two crossed coils, whose field components join themselves together to a resulting field, whose relative position to a magnetic reference field is indicated by the measuring device.

More particularly the present invention relates to a voltage divider or potentiometer which possesses a frictionless connection of practically no electric resistance between the resistance element of the voltage divider and the feeding points which are movable relative thereto. Such a device is of importance for remote-transmissions in which the voltage divider or potentiometer acting as transmitter is controlled by very slight directional forces as is the case in remote-controlled compasses.

The object of the invention is illustrated in Figs. 1 and 2 in one embodiment, i. e. Fig. 1 illustrates schematically the complete wiring of the voltage divider acting as transmitter for a remote-transmission system and the receiving instrument, whilst Fig. 2 is a vertical section of the transmitter according to Fig. 1.

Fig. 1 shows a remote indication wiring with a receiver of the type of a quotient meter with two single coils 11, 12, being perpendicular to one another, and a magnet needle system 13, which adjusts itself to the resulting field of the component fields generated in the coils 11, 12. The ends of each of the two coils 11, 12 are connected to two diametrical tapping points 4, 4' and 5, 5' of a resistance ring 22 acting as transmitter, to which the tapping points are relatively fixed. The tapping points of the resistance ring 22 for both receiver coils are displaced by 90° relative to one another. The feeding points, arranged diametrically to the resistance ring and jointly movable relative to this, are connected to the clamps of a direct or alternate voltage source E. When feeding the voltage divider by means of alternate voltage, the magnet needle system 13 is replaced by an electro-magnet system, whereby in this case the current feeding of the electro-magnet system is effected by means of sliding supplies. The invention consists therein that the resistance ring 22 is fed over sliding contacts, but over glow discharge paths. For this purpose the resistance ring 22 is enclosed in an air-tight chamber 7 which is filled with rare gas of slight pressure. In this receptacle a compass magnet system M, acting as transmitter is turnably mounted. This magnet system is supported by an insulating, for instance of glass, hollow axis 8, which is rotatably mounted on the bearings 21, 21' of the casing 7. Supply wires 9, 9' for the laterally extended electrodes 10, 10' lie in borings of the axis 8; said electrodes are arranged movable along the resistance ring and at a certain distance away from same. The supply wires are connected over the conducting bearings 21, 21' with the voltage source E. Each of the electrodes 10, 10', movable with the compass magnet system, forms with the resistance ring a glow discharge path over which current is supplied to the coils of the receiving instrument.

In the described arrangement the magnetic flux in one of the coils 11, 12 of the receiving instrument increases from a minimum value to a maximum value due to the joint turning of the electrodes 10, 10' relative to the resistance ring, whilst in the other coil of the receiving instrument the magnetic flux decreases at the same time from a maximum value to a smallest value. The two magnetic fluxes of the coils are, therefore, again displaced in the phase by 90°. A turning of the receiving instrument by more than 90° is effected by change in direction of one of the magnetic fluxes when using a direct voltage source or turning around of the phase position when using an alternate voltage source, which takes place after each 90°-turning of the transmitter.

Deviations in the length of both glow discharge paths have no influence on the adjustment of the receiving instrument, as such deviations influence both coil circuits and, therefore, the magnetic fluxes of both receiving coils 11, 12 are influenced in the same manner. The described arrangement has the special advantage that friction resistances, caused by gliding of the contacts on the resistance ring, are completely avoided.

The stationary arrangement of the resistance ring and the turning of the electrodes have the advantage that in this case for the current supply no sliding rings and brushes are needed.

What is claimed is:

1. A voltage divider comprising a closed casing filled with a gas at slight pressure; an electric resistance element having tapping points fixed thereto and electrodes enclosed by said casing; said electrodes being movable relative to and along said resistance at a constant distance therefrom forming thereby glow discharge paths between the electrodes and the respective directly opposite portions of the resistance.

2. A voltage comprising a closed casing filled with a gas at slight pressure; a closed annular electric resistance having fixed tapping points, and a pair of electrodes enclosed by said casing; said electrodes being diametrical to said annular resistance and jointly movable relative to and along said annular resistance at a constant distance therefrom forming thereby glow discharge paths between the electrodes and the respective directly opposite portions of the annular resistance.

3. A voltage divider as claimed in claim 2, in which the annular electrical resistance is mounted in a stationary relationship and in which the electrodes are supported by an axis rotatably mounted in bearings of said casing which are of electrical conducting material for feeding the electrodes with electrical energy.

WOLFGANG MÜLLER.